United States Patent [19] [11] 4,011,192
Lees [45] Mar. 8, 1977

[54] COLORED YARNS
[75] Inventor: Gerard Lees, Harrogate, England
[73] Assignee: Imperial Chemical Industries Limited, London, England
[22] Filed: Dec. 13, 1971
[21] Appl. No.: 207,229
[52] U.S. Cl. .......................... 260/37 P; 260/37 NP; 260/40 P
[51] Int. Cl.² .......................................... C08J 3/20
[58] Field of Search .......... 260/40 P, 37 P, 37 NP; 57/140 BY; 264/167, 211, 75, 103, 141, 143

[56] References Cited
UNITED STATES PATENTS

| | | | |
|---|---|---|---|
| 2,477,170 | 7/1949 | Bradersan et al. ................... | 264/75 |
| 2,571,319 | 10/1951 | Waters et al. ................ | 260/40 P X |
| 3,409,585 | 11/1968 | Hazemeyer et al. ............. | 260/37 P |
| 3,496,133 | 2/1970 | Hoffman .......................... | 260/40 P |

Primary Examiner—Melvyn I. Marquis
Assistant Examiner—S. M. Person
Attorney, Agent, or Firm—Cushman, Darby & Cushman

[57] ABSTRACT

Manufacture of variegated yarns from thermoplastic polymer by incorporation of color at extrusion with interval of change of type or quantity of color greater than 0.03 T, where T is half-decay time for instantaneous injection of color.

13 Claims, 2 Drawing Figures

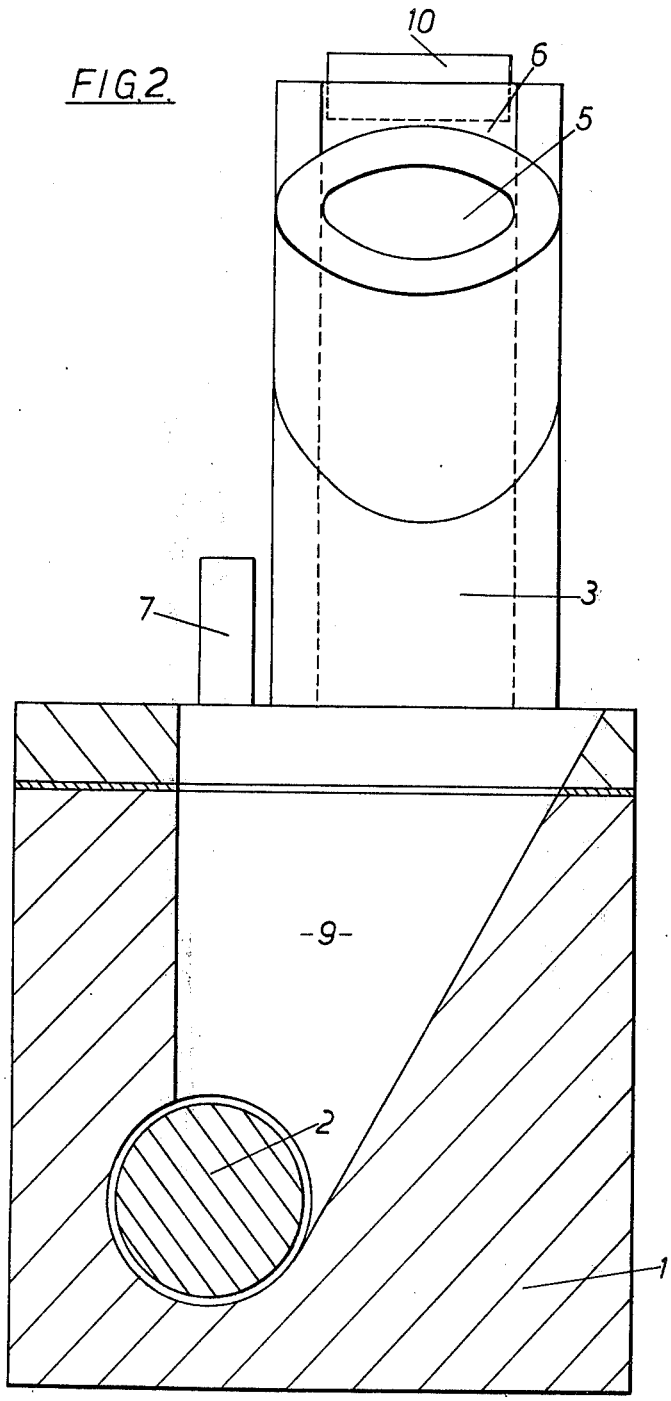

COLORED YARNS

The present invention relates to the manufacture by a melt-spinning process of yarns which vary in colour along their length.

According to the present invention we provide a process for the manufacture of a yarn comprising a thermoplastic polymer and a colouring material, wherein the thermoplastic polymer in the molten state is mixed with a feed of colouring material and forwarded at a metered rate to means for forming at least one filament, characterised in that periodical changes are made in the rate of addition, or composition, of the colouring material feed, the successive changes being effected at a time interval greater than 0.03T, as hereinafter defined.

The value of T, the half-decay time, is determined as follows. The melter to be used is arranged to deliver to a spinneret with arrangements for winding up the spun yarn. The melter is fed with thermoplastic granules and, when steady melt-spinning is established, an instantaneous charge of suitable colour is added to the feed of thermoplastic granules. Spun yarn samples are taken at timed intervals covering the period from the moment when the yarn is first coloured to the time when most of the colour has passed through the spinneret. The content of colour in each of the samples of yarn is determined by a suitable method. This can, for example, be done by extraction by a suitable solvent when the colour is a soluble colour. From the results a curve is plotted of content of colour against time. The resultant curve will usually be asymmetric, with a relatively rapid rise to a peak and thereafter a more gradual fall. The time taken for the colour content of the yarn to fall from the maximum level to one-half of that level is defined as the half-decay time, T.

An advantage of the use of the process of our invention is that thereby staple fibre may conveniently be manufactured of which the individual fibres are of varying colour giving the effect of melange or Vigoureaux printing without the need to employ a multiplicity of extruders each handling a different colour or the need to print on or treat tow or silver. This is achieved by the production of a multiplicity of cans of variegated yarn and combination of the yarns from the total number of cans before or after drawing to form a larger tow before cutting into staple. A further advantage of the process of our invention is that while the changeover from one colour to another results in the production of some mixed colour, the requirement that the interval between successive changes in the colours should be no less than 0.03 T ensures that an appreciable proportion of the yarn between mixed colours is of a relatively pure colour, corresponding to that of the colouring material added. Thus in the resultant yarn there is a greater number of colours than the number of different colouring materials employed. Thus a more complicated mixture of individual colours of fibres in the staple fibre is possible than would otherwise be produced.

In the case wherein it is desired to produce a significant proportion of the yarn of appearance corresponding to the change period, then no single condition should be allowed to persist for longer than 10 T. This limitation is of particular advantage when the change is from one colour to another.

The source of molten thermoplastic polymer may, for example, be the product of the preparation of the polymer by a liquid phase process, or may be produced immediately prior to mixing with the colouring material, by the melting of granules, for example in a screw extruder. Mixing may also be effected in a screw extruder, which may be that in which the melting is effected, or any other suitable means.

Within the spirit of our invention considerable variation may be made in the mode of operation. Thus any number of different colouring materials may be used and the pattern of employment of the various colours may be regular or random. The expression "colouring material" may refer to a single compound or to more than one compound in fixed proportions. The colouring material, or a constituent or the constituents of the colouring material, may be soluble in the thermoplastic polymer or may be insoluble in the thermoplastic polymer but in that case should preferably be predispersed in a suitable medium. The change may for example, be from a particular level of one colour to another level of the same colour, this includes a change from some colour to no colour. The change may be from two colours (a) plus (b) to colour (a) or colour (b) alone. The change may be from a particular ratio of two colours to another ratio of the same two colours.

Our invention includes the addition of the colour material in the form of a fine powder, as a dispersion or as a solution in a liquid compatible with the thermoplastic polymer or readily removed from it by volatilisation in subsequent processing. Our invention also includes the addition of the colouring material in the form of granules or capsules containing colouring material in powder or liquid form. The granules or capsules may be of uniform weight, and change of rate of addition of colouring material or of relative amounts of more than one colouring material effected by change in frequency of addition, or the change in rate of addition or of relative amounts of more than one colouring material effected by change in size of granule or capsule. The granules or capsules of colouring material may each be composed of one coloured substance, or of more than one coloured substance.

Preferably the method of adding the colouring materials and the method of handling the molten thermoplastic polymer is such as to ensure good mixing, so that local concentrations of colour and large aggregates of colouring material are avoided. Advantageously, a screw extruder may be used for the melting of the thermoplastic polymer, and the colouring material, in the form of granules or capsules, is added up-stream of the feed of thermoplastic polymer granules, so that the colouring material falls into an unfilled flight of the extruder screw and is followed by the thermoplastic polymer granules, thus ensuring that there is no segregation of the colouring material. This method also allows the control of the proportion of colouring material to be effected by counting in of the granules or capsules if they are of standard weight. In the case of the use of granules or capsules of colouring material, the use of relatively small granules or capsules is desirable in order to permit the impressing of a relatively small degree of fluctuation of concentration of colour in the filaments, which is obtainable by high frequency feeding of one colour of granule or capsule, thus ensuring maximum flexibility of the process.

Preferably the colouring material for use in the process of our invention should be soluble in the molten thermoplastic polymer. Suitable colours for use in the process can be any of the dyestuffs, particularly disperse dyestuffs, which are conventionally employed in the dyeing of thermoplastic polymers, particularly those given in Volume 1 of the second edition of the Colour Index (1956).

The multicoloured tow may be used as such, or may be crimped and cut into staple fibre. More than one tow may be combined to form a larger tow before cutting to form staple fibre.

Preferably the extruder employed should be of such design that T is as short as possible in order to make possible a rapid change in the appearance of the yarn being produced and thus to allow the greatest possible flexibility in operation.

In order that the process of our invention may the more easily be understood, we give hereinafter examples of methods in which it may be put into practice. In these examples all parts and percentages are by weight.

The apparatus used is illustrated in FIGS. 1 and 2 in which

FIG. 2 shows a section through A—A of FIG. 1.

Figure 1:
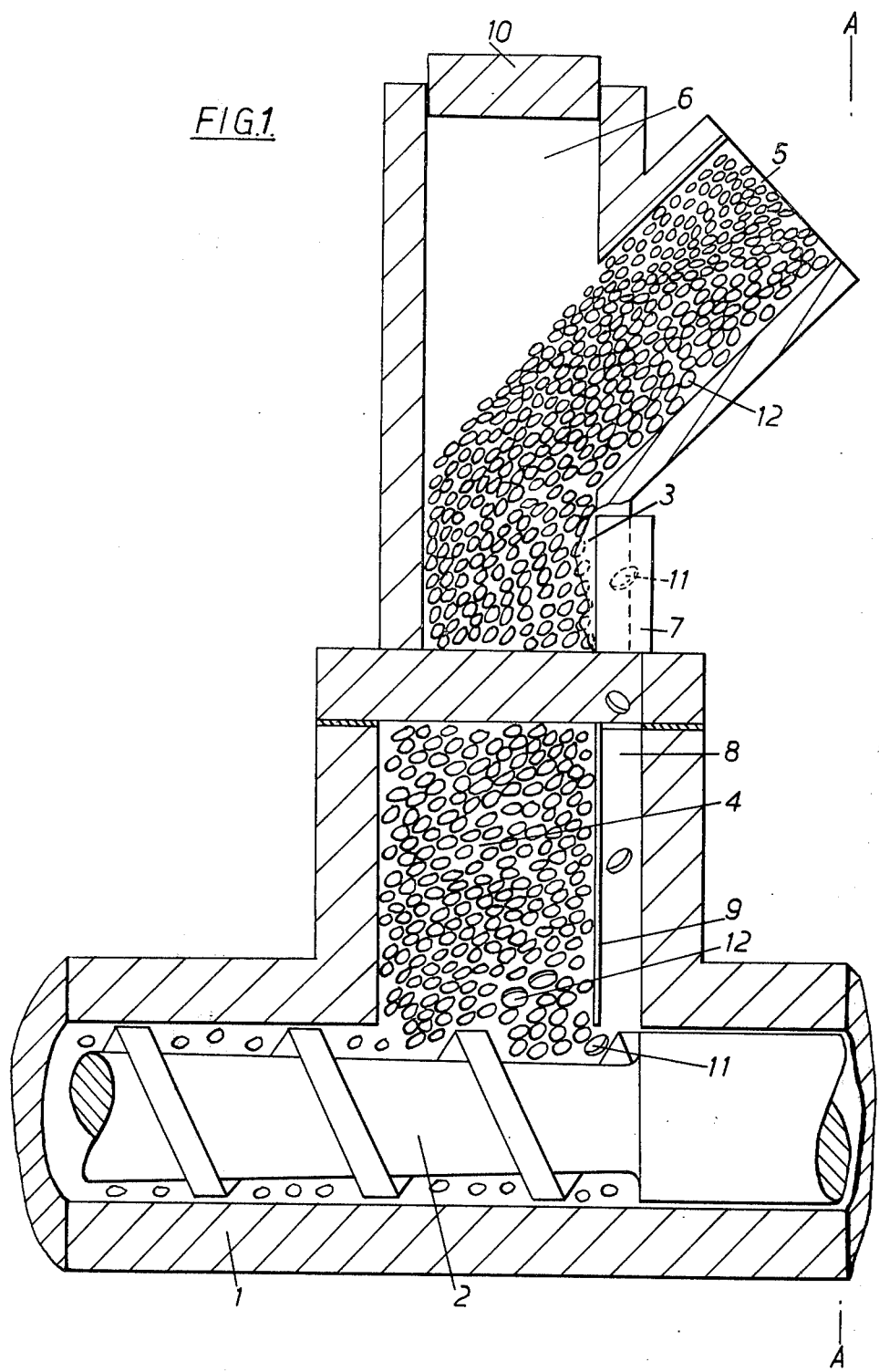
FIG. 1 shows a screw extruder adapted for use according to our invention.

Referring to FIGS. 1 and 2, the screw extruder comprises a body (1) and screw (2), and entry tube (3) allows feed of thermoplastic polymer granules (12) to the tangential feed pocket (4). An angled feed tube (5) and a vertical feed tube (6) each communicate with the entry tube (3). An additive feed tube (7) communicates with a separate tangential feed pocket (8), separated from the tangential feed pocket (4) by a divider plate (9) fitting closely to the path swept by the screw (2) from which it has about a sixteenth inch clearance. A plug (10) effects closure of the vertical feed tube (6) when not in use.

In operation, the thermoplastic polymer granules (12) fill the angled feed tube (5), the entry tube (3) and the tangential feed pocket (4). Pellets (11) are fed at a desired rate into the additive feed tube (7) pass into the separate tangential feed pocket (8) and thence to the upstream end of the screw (2). A pellet (11), as it arrives at the screw (2) is forwarded into the tangential feed pocket (4) wherein it is covered by thermoplastic polymer granules (12) and is readily incorporated on melting into the melting thermoplastic polymer at the desired proportion.

The apparatus hereinbefore described was used in the following example of the incorporation of dyestuffs into poly(ethylene terephthalate).

Determination of the half decay time, T gave a value of 1 minute.

Poly(ethylene terephthalate) was prepared by the esterinterchange of dimethyl terephthalate and ethylene glycol using calcium acetate (0.664% by weight based on dimethyl terephthalate) under normal esterinterchange reaction conditions. After completion of ester-interchange, phosphorus acid (0.05% based on dimethyl terephthalate) and antimony trioxide (0.06% based on dimethyl terephthalate) and titanium dioxide in proportion sufficient to give 0.5% on polyester, were added and reaction continued under polycondensation conditions to give a polyester of relative viscosity 1.8 as measured as a 1g. per 100 ml. solution in orthochlorophenol. The polyester was extruded from the reactor and chipped.

EXAMPLE 1

A supply of 5/16 inch diameter pellets was prepared from each of the following dyes:
CI Disperse Orange 30
CI Disperse Blue 79
CI Disperse Red 72

Each of the dyes was in the form of 96 to 98% pure dye. Each pellet was approximately 0.25g. The pellets were blended together in the ratio of 190:30:10 respectively.

Melt spinning was established of the poly(ethylene terephthalate) prepared as hereinbefore described in the form of 5/32 inch × 5/32 inch × ⅛ inch chips and using a 2 inch 28.1 l/d screw extruder for melting and feeding. The barrel of the extruder and the spinning temperature were maintained within the range 280°–290° C. Spinning of filaments was from a 504 hole spinneret of 0.018 inch hole size at 60 pounds per hour throughput (27.22 Kg per hour). The filaments were collected on bobbins at 2,600 feet per minute wind up speed.

The dyestuff pellets were then fed individually, in random colour order down the feed tube (7) at a uniform rate of 18 pellets per minute. That is individual pellets were added at an interval of 3.1 seconds, that is the interval between them was 0.052 T. The colour of the resultant spun yarn varied between bright orange, bright red and navy blue with all of the possible blends of olive, green, brown and black appearing in a random manner. Distinct periodic colour changes were observed in the yarn but the overall content of colour remained within the limits 0.9% to 1.1%.

Successive bobbins of the yarn were collected and 87 ends collected to form a 450,000 denier tow. The tow was drawn, crimped and chopped into staple fibre. This is hereinafter referred to as product A. No significant overall colour difference could be detected using a Colormaster Mk V colorimeter between the fibre produced at the beginning, the middle and the end of the drawing sequence. The fibre mixture was of superior aesthetic appearance to that of a yarn which was a mixture of individual fibres of the three colours orange, bright red and navy blue. The fibre mixture was also of superior aesthetic appearance to that of a fibre produced from a yarn coloured uniformly by the addition of the above three colours C.I. Disperse Orange 30, C.I. Disperse Blue 79 and C.I. Disperse Red 72 as a blend in the same proportions of 190:30:10 when the blended mixture of colours had been formed into 5/16 inch diameter pellets and fed at the same rate of 18 pellets per minute as was employed in the experiment described hereinbefore, drawn and cut to form staple fibre. This is hereinafter referred to as product B.

The staple fibre mixture, product A, was spun into two fold yarn of 32 worsted count and woven into a plain construction comprising 42 ends and 42 picks per inch. This is referred to hereinafter as fabric A.

The staple fibre product B was spun into two fold yarn of 32 worsted count and woven into a plain construction comprising 42 ends and 42 picks per inch. This is referred to hereinafter as fabric B.

Comparison of fabric A with fabric B showed that fabric A had a more lively blended appearance.

EXAMPLE 2

Melt spinning was established of poly(ethylene terephthalate) exactly as in Example 1 with the only distinction that the polyester melt was fed to two 504 hole spinnerets each spinning at 60 pounds per hour throughput (27.22 kg. per hour).

A supply of 5/16 inch diameter pellets was prepared for each of the following dyes:

CI Disperse Orange 30,
3-methyl-6-p-toluidino-1′:9′-anthrapyridone,
1-amino-4-p-toluidino-2-benzenesulphonylanthraquinone.

Each of the dyes was in the form of 96–98% pure dye. Each pellet was approximately 0.25g. The pellets were blended together in the ratio 45:5:35 respectively.

The dyestuff pellets were then fed individually, in random colour order down the feed tube (7) at a uniform rate of 33 pellets per minute. That is, the individual pellets were added at an interval of 1.82 seconds, thus the time interval between pellets was 0.0303 T and the smallest time interval between change of colour would be greater than 0.03 T.

The colour of the resultant spun yarn varied between bright blue, orange and brown with all the possible blends of olive, green and brown appearing in a random manner along the length. Distinct periodic changes were observed in the yarn, but the overall content of colour remained constant at 0.85% ± 10%.

Successive bobbins of the yarn were collected and 43 ends collected to form a 450,000 denier tow. The tow was drawn, crimped and chopped into staple fibre. This was examined using a Colormaster Mk V model colorimeter and no difference could be detected in colour value between fibre from the beginning, middle or end of the length of tow. The fibre so produced was of superior aesthetic appearance to that of a yarn coloured uniformly by the addition of the above three dyes in the same relative proportions of 45:5:35 as 5/16 inch diameter pellets of mixed dye at the same rate of 33 pellets per minute.

What we claim is:

1. In a process for the manufacture of a yarn comprising a thermoplastic polymer and a coloring material, wherein the thermoplastic polymer in the molten state is mixed with a feed of coloring material and forwarded at a metered rate to means for forming at least one filament, the improvement whereby periodical changes are made in the rate of addition, or composition, of the coloring material feed, the successive changes being effected at a time interval greater than 0.03 T, and no greater than 10 T where T is the half-decay time for instantaneous injection of color.

2. A process according to claim 1 wherein the source of thermoplastic polymer in the molten state is obtained by the melting of granules of the thermoplastic polymer.

3. A process according to claim 1 wherein the feed of colouring material is in discrete portions of predetermined weight.

4. A process according to claim 3 wherein the discrete portions are in the form of granules.

5. A process according to claim 3 wherein the discrete portions are in the form of capsules.

6. A process according to claim 1 wherein a screw extruder is used to effect mixing of the thermoplastic polymer melt and the colouring material.

7. A process according to claim 2 wherein melting of the granules of thermoplastic polymer is effected in a screw extruder.

8. A process according to claim 1 wherein the colouring material is soluble in the thermoplastic polymer.

9. A process according to claim 1 wherein the colouring material is insoluble in the thermoplastic polymer and is predispersed in a suitable medium.

10. A process according to claim 8 wherein the colouring material is a disperse dyestuff as listed in Volume 1 of the second edition of the Colour Index.

11. A process according to claim 1 wherein successive lengths of the resultant yarn, or the yarns from a plurality of means for forming the yarn, are combined, before or after drawing, and the drawn combined yarn cut to form staple fibre of mixed colour.

12. A yarn prepared from the staple fibre of claim 11.

13. A fabric from the staple fibre of claim 12.

* * * * *

UNITED STATES PATENT OFFICE
CERTIFICATE OF CORRECTION

Patent No. 4,011,192  Dated March 8, 1977

Inventor(s) Gerard Lees

It is certified that error appears in the above-identified patent and that said Letters Patent are hereby corrected as shown below:

On the front page format, after paragraph "[21]", insert --[30] Foreign Application Priority Data
December 15, 1970  Great Britain.......59521/70--

Column 3, line 60, "phosphorus" should read --phosphorous--.

Signed and Sealed this nineteenth Day of July 1977

[SEAL]

Attest:

RUTH C. MASON
*Attesting Officer*

C. MARSHALL DANN
*Commissioner of Patents and Trademarks*